US 10,592,478 B1

(12) United States Patent
Danilov et al.

(10) Patent No.: US 10,592,478 B1
(45) Date of Patent: Mar. 17, 2020

(54) SYSTEM AND METHOD FOR REVERSE REPLICATION

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 185 days.

(21) Appl. No.: 15/791,396

(22) Filed: Oct. 23, 2017

(51) Int. Cl.
*G06F 16/00* (2019.01)
*G06F 16/182* (2019.01)
*G06F 16/27* (2019.01)

(52) U.S. Cl.
CPC ......... *G06F 16/1844* (2019.01); *G06F 16/27* (2019.01)

(58) Field of Classification Search
CPC .. G06F 16/1844; G06F 16/27; G06F 16/4387; G06F 16/41; G06F 16/44; G06F 16/275; G06F 16/00; G06F 11/1451; G06F 11/2071; G06F 11/1458; G06F 11/1446; G06F 11/2076; G06F 11/2082; G06F 17/30; G06F 16/835; G06F 16/21; G06F 16/86; G06F 16/1744; G06F 16/258; G06F 16/90; G06F 16/907; G06F 16/337; G06F 21/10; G06F 221/2113; G06F 16/2462; G06F 16/9014; G06F 16/2455; G06F 16/9026; G06F 16/3347; G06F 16/24575; G06F 16/1756; G06F 3/0604; G06F 3/064; G06F 3/0673; G06F 17/30587; G06F 11/2069; G06F 11/1076; G06F 3/0634; G06F 3/0613; G06F 3/0617; G06F 11/1445; H04L 67/1017; H04L 67/1097; H04L 67/2842; H04L 65/60; H04L 65/4069; H04L 67/1095; H04L 67/306; H04N 21/47202; H04N 7/17318; H04N 21/812; H04N 65/4069; H04N 19/89; G11B 27/034; G06Q 50/01; G06Q 10/00; H03M 13/154
See application file for complete search history.

(56) References Cited

U.S. PATENT DOCUMENTS

| | | | | |
|---|---|---|---|---|
| 7,840,992 B1 * | 11/2010 | Dufrene | | G06F 11/1461 726/1 |
| 7,913,051 B1 * | 3/2011 | Todd | | G06F 16/137 711/165 |
| 8,935,446 B1 | 1/2015 | Shilane et al. | | |

(Continued)

*Primary Examiner* — Anh Ly
(74) *Attorney, Agent, or Firm* — Amin, Turocy & Watson, LLP

(57) ABSTRACT

Inter-zone data replication in a distributed storage system can be organized. In one aspect, a replication destination zone can send a new data portion to a replication source zone to reduce inter-zone traffic. The new data portion can be stored within one or more chunks within the replication source zone, which can then provide the replication destination zone with location information (e.g., chunk identifier (ID), offset within chunk, segment size, etc.) indicative of a location of the new data portion within one or more chunks. The location information can be utilized by the replication destination zone to store a backup copy of the new data portion. Since the backup copy is stored without data replication from the replication source zone to the replication destination zone, inter-zone network traffic is significantly reduced.

20 Claims, 10 Drawing Sheets

(56) References Cited

U.S. PATENT DOCUMENTS

| | | | |
|---|---|---|---|
| 8,935,493 B1* | 1/2015 | Dolan | G06F 3/0649 711/117 |
| 9,026,765 B1* | 5/2015 | Marshak | G06F 3/061 711/114 |
| 9,052,830 B1* | 6/2015 | Marshak | G06F 3/064 |
| 9,189,414 B1 | 11/2015 | Shim et al. | |
| 2006/0112222 A1 | 5/2006 | Barrall | |
| 2007/0266037 A1 | 11/2007 | Terry et al. | |
| 2008/0184074 A1* | 7/2008 | Smith | G06F 11/0727 714/37 |
| 2011/0196830 A1* | 8/2011 | Zunger | H04L 67/1095 707/624 |
| 2011/0196833 A1* | 8/2011 | Drobychev | G06F 16/23 707/634 |
| 2012/0166403 A1* | 6/2012 | Kim | G06F 16/1748 707/692 |
| 2012/0233418 A1* | 9/2012 | Barton | H04L 67/1095 711/162 |
| 2013/0041872 A1* | 2/2013 | Aizman | G06F 16/182 707/690 |
| 2013/0061084 A1* | 3/2013 | Barton | H04L 67/1095 713/400 |
| 2014/0380125 A1* | 12/2014 | Calder | G06F 11/10 714/766 |
| 2014/0380126 A1* | 12/2014 | Yekhanin | G06F 11/10 714/766 |
| 2015/0213068 A1* | 7/2015 | Tamura | G06F 16/22 707/741 |
| 2016/0210200 A1* | 7/2016 | Kumarasamy | G06F 11/1464 |
| 2016/0350391 A1* | 12/2016 | Vijayan | G06F 3/065 |
| 2016/0380650 A1* | 12/2016 | Calder | G06F 11/1076 714/766 |
| 2018/0020050 A1* | 1/2018 | Baldwin | H04L 67/1095 |
| 2018/0181324 A1* | 6/2018 | Danilov | G06F 3/0608 |
| 2018/0181475 A1* | 6/2018 | Danilov | G06F 11/2069 |
| 2018/0373887 A1* | 12/2018 | Smith | H04L 63/0428 |

\* cited by examiner

US 10,592,478 B1

SYSTEM AND METHOD FOR REVERSE REPLICATION

TECHNICAL FIELD

The subject disclosure relates generally to distributed storage systems, for example, a system and method for reverse replication.

BACKGROUND

The large increase in amount of data generated by digital systems has created a new set of challenges for data storage environments. Traditional storage area network (SAN) and/or network-attached storage (NAS) architectures have not been designed to support data storage or protection at large multi-petabyte capacity levels. Object storage technology can be utilized to meet these requirements. With object storage technology, organizations can not only keep up with rising capacity levels, but can also store these new capacity levels at a manageable cost point.

Typically, a scale-out, cluster-based, shared-nothing object storage that employs a microservices architecture pattern, for example, an Elastic Cloud Storage (ECS) can be utilized as a storage environment for a new generation of workloads. ECS is a cloud-based object storage appliance, wherein the storage control software and the physical magnetic disk media are combined as an integrated system with no access to the storage media other than through the ECS. ECS is an append-only virtual storage platform that protects content from being erased or overwritten for a specified retention period. In particular, ECS does not employ traditional data protection schemes like mirroring or parity protection. Instead, ECS utilizes erasure coding for data protection, wherein a data chunk is broken into fragments, expanded, and encoded with redundant data pieces and then stored across a set of different locations or storage media. However, replication of data across different geographical zones can create significant inter-zone traffic.

The above-described background relating to storage systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to data replication in cloud-based storage systems. In one example embodiment, a system is disclosed that comprises a processor and a memory that stores executable instructions that, when executed by the processor, facilitate performance of operations. Moreover, the operations comprise in response to determining that data is to be stored within a first zone of a distributed storage system, facilitating a transmission of the data from a second zone of the distributed storage system to the first zone, wherein the first zone is deployed within a first geographical area and the second zone is deployed within a second geographical area. Further, the operations comprise receiving, from the first zone, location information that represents a location of the data within one or more chunks of disk space within first zone, and based on the location information, storing a backup copy of the data within the second zone.

Another example embodiment of the specification relates to a method that comprises in response to determining that data is to be stored within a first zone of a distributed storage system, directing, by a system comprising a processor, the data from a second zone of the distributed storage system to the first zone, wherein the first zone is deployed within a first geographical area and the second zone is deployed within a second geographical area. According to an aspect, the method further comprises subsequent to the data being stored within one or more chunks of storage space within first zone, receiving, from the first zone, location information that represents a location of the data within the one or more chunks, and based on the location information, storing a backup copy of the data within the second zone.

Another example embodiment of the specification relates to a computer-readable storage medium comprising instructions that, in response to execution, cause a system comprising a processor to perform operations, comprising in response to determining that data is to be stored within a first zone of a distributed storage system, receiving the data from a second zone of the distributed storage system, wherein the first zone is deployed within a first geographical area and the second zone is deployed within a second geographical area; storing the data within at least one chunk of storage space within the first zone; and in response to determining that the second zone is designated as a replication destination zone that is employable to store a backup copy of the data, directing, to the second zone, location information that represents a location of the data within the at least one chunk.

The following description and the drawings set forth certain illustrative aspects of the specification. These aspects are indicative a few of the various ways in which the principles of the specification may be employed. Other advantages and novel features of the specification will become apparent from the detailed description of the specification when considered in conjunction with the drawings.

DETAILED DESCRIPTION

Figure 1:
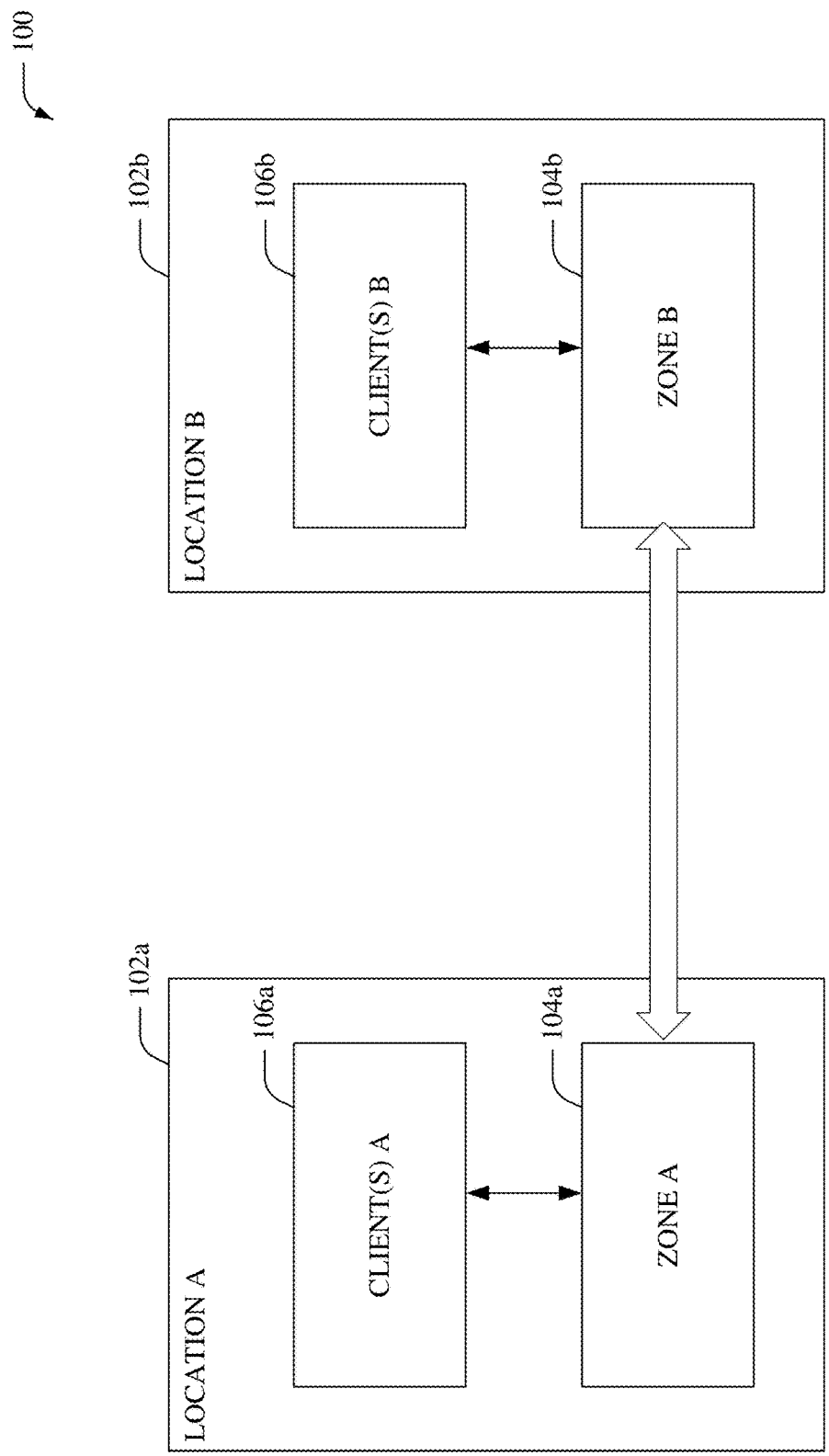
FIG. 1 illustrates an example system that facilitates inter-zone data replication in a distributed cloud storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Further, the term "storage device" can refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Example systems and methods disclosed herein, in one or more embodiments, relate to a scale-out elastic cloud storage (ECS) platform that can combine the cost advantages of commodity infrastructure with the reliability, availability and serviceability of traditional arrays. In one aspect, the ECS platform can comprise a cluster of nodes (also referred to as "cluster" herein) that delivers scalable and simple public cloud services with the reliability and/or control of a private-cloud infrastructure. Moreover, the ECS platform comprises a scale-out, cluster-based, shared-nothing object storage, which employs a microservices architecture pattern. The ECS platform can support storage, manipulation, and/or analysis of unstructured data on a massive scale on commodity hardware. As an example, ECS can support mobile, cloud, big data, and/or social networking applications. ECS can be deployed as a turnkey storage appliance or as a software product that can be installed on a set of qualified commodity servers and disks. The ECS scale-out, geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In one aspect, the storage systems described herein utilize blocks of data, hereinafter 'data chunks', or simply 'chunks', to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually, the chunk can be replicated 'off-site', e.g., copied to a storage device deployed within different geographical location, to provide for disaster recovery, etc. For example, data chunks from a data storage device located in a first geographic location, hereinafter a 'zone storage component', 'zone storage device', etc., can be stored in a second zone storage device that is located at a second geographic location different from the first geographic location. This can enable recovery of data where the first zone storage device is damaged, destroyed, offline, unavailable, etc., e.g., disaster recovery of data, by accessing the off-site data from the second zone storage device. Typically, the replication mechanism works at the chunk level (e.g., not at the object level) because the inter-zone network can perform better with larger/bulk data transfers.

The systems and methods disclosed herein organize inter-zone data replication. In one aspect, a replication destination zone can send a new data portion to a replication source zone. Although the systems and methods disclosed herein have been described with respect to object storage systems (e.g., ECS), it is noted that the subject specification is not limited to object storage systems and can be utilized for most any distributed storage systems that replicate data between zones (e.g., file storage systems, such as but not limited to, Dell EMC® Isilon file storage system).

Referring initially to FIG. 1, there illustrated is an example system 100 that facilitates inter-zone data replication in a distributed cloud storage system, according to one or more aspects of the disclosed subject matter. In one aspect, the distributed cloud storage system (e.g., ECS) can ensure durability, reliability, and/or availability of data chunks by creating and distributing one or more copies of the data chunks across different geographical locations, for example, location A 102*a* and/or location B 102*b*.

Typically, a storage service layer can handle data availability and protection against data corruption, hardware failures, and/or data center disasters. A storage engine can be a part of the storage services layer. As an example, the storage engine can be a distributed shared service that runs on each node (e.g., within zone A 104*a* and/or zone B 104*b*), and can manage transactions and persists data to the nodes. Typically, the storage engine can enable global namespace management across geographically dispersed data centers through geo-replication. Moreover, a primary zone can be defined for each user object (e.g., requested by a client(s) A 106*a* and/or client(s) B 106*b*). Normally, a primary zone is a zone, which has created the user object. All requests related to the user object can be handled by its primary zone. According to an aspect, the storage engine can write all object-related data (e.g., user data, metadata, and/or object location data, etc.) to logical containers of contiguous disk space known as chunks. Chunks are open and accepting writes, or closed and not accepting writes. In one example, the storage engine can erasure code the chunks after chunks are closed.

According to an embodiment, new data can be created at a location, for example, location A 102a, by client(s) A 106a, and can be stored to another location, for example, location B 102b. In one example, the new data being created can be an update for an object, which has been assigned Zone B 104b as its primary zone. In another example, when client(s) A 106a is attempting to create the new data object within the storage GEO setup, a load balancer component (e.g., implemented by one or more of the devices of the distributed cloud storage system) can re-direct creation of the new data object to a less loaded zone, for example, Zone B 104b. This example scenarios can occur often when a new zone is added to an existing GEO setup.

In conventional systems, the data is transferred from location A 102a to location B 102b during data creation and if the data is to be replicated in zone A 104a, the entire data is transferred back from location B 102b to location A 102a. Thus, inter-zone network traffic is significantly high. In contrast, system 100 reduces the inter-zone network traffic as described below.

When storage client A 106a creates a new data portion that is determined to be stored to the zone B 104b, the new data portion is transferred to zone B104b through the zone A 104a. If zone A 104a is determined to be a replication destination for the new data portion, zone B 104b can simply provide zone A 104a with location information (e.g., chunk identifier (ID), offset within chunk, segment size, etc.) for the new data portion. Zone A 104a can utilize the location information to store the new data portion to its chunks. It is noted that the chunks are owned by zone B 104b. In some example scenarios, zone A 104a does not have information about some chunks. In this case, zone A 104a can pre-create such chunks to store the new data portion without a delay. At the end, two copies of the data portion are stored in system 100, the primary copy at location B 102b and the backup copy at location A 102a. Since the backup copy is stored without data replication from zone B 104b to zone A 104a, inter-zone network traffic is reduced.

In one example, system 100 can be part of most any object storage system such as, but not limited to, a Dell EMC® Elastic Cloud Storage (ECS™). Although only two locations have been depicted in FIG. 1, it is noted that the subject specification is not limited to two locations and that more than two locations can be utilized for geo replication. Further, it is noted that the zones (e.g., zone A 104a and/or zone B 104b) can comprise one or more storage devices that comprise volatile memory(s) or nonvolatile memory(s), or comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory. Although systems and methods disclosed describe a scale-out architecture, it is noted that the subject specification is not limited to scale-out architectures and can be applied to scale-up architecture as well.

Figure 2:
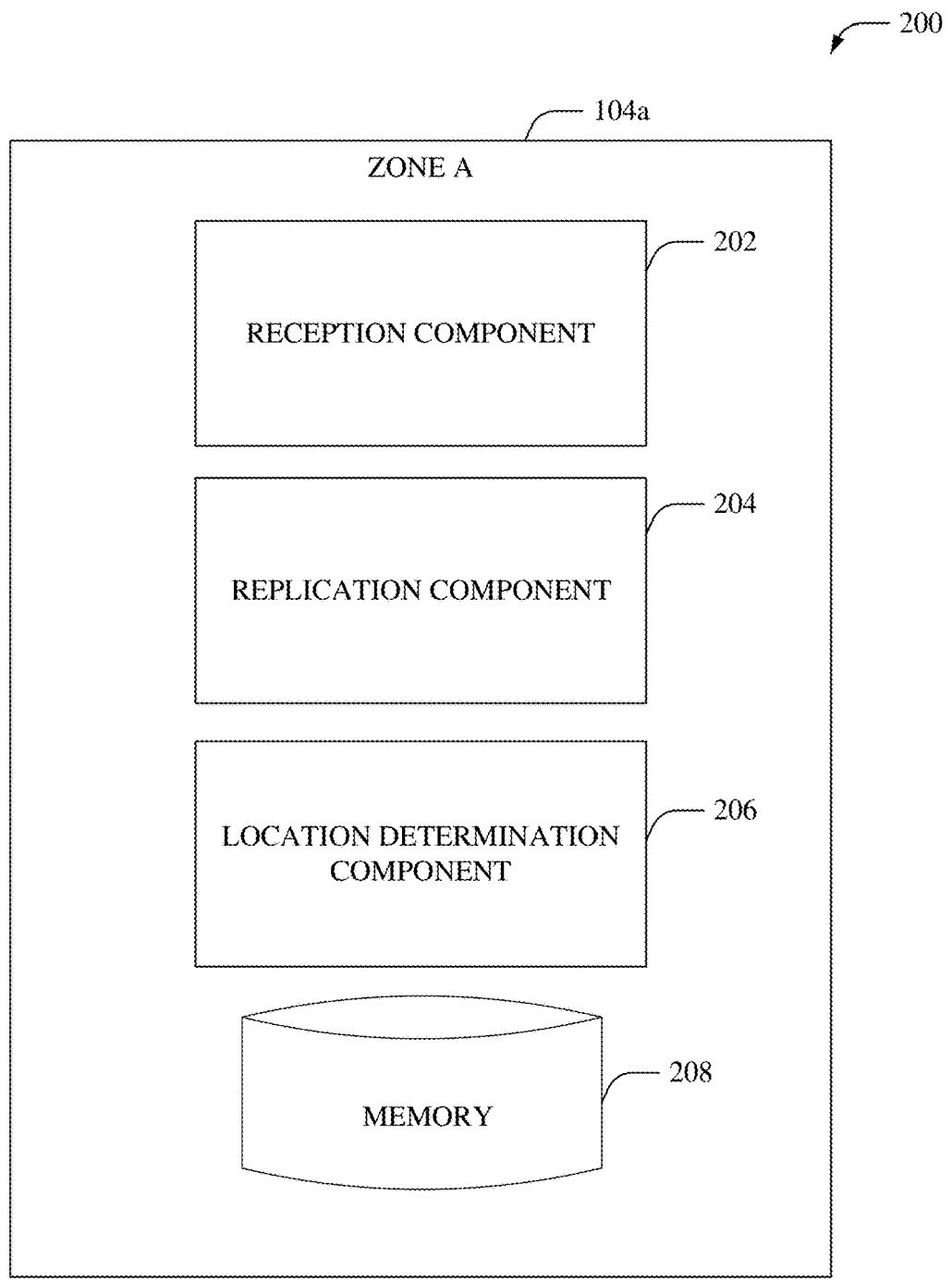
FIG. 2 illustrates an example system that re-directs creation of a new data object to facilitate reverse replication.

Referring now to FIG. 2, there is illustrated is an example system 200 that re-directs creation of a new data object to facilitate reverse replication, according to an aspect of the specification. As an example, system 200 can be implemented by one or more nodes within a replication destination zone (e.g., zone A 104a). According to an aspect, during reverse replication, the replication destination zone sends a new data portion to a replication source zone. Traditional replication works the opposite way, wherein a replication source zone sends a new data portion to a replication destination zone.

In an aspect, a reception component 202 can receive a new data portion, for example, from a locally coupled storage client. As an example, the locally coupled storage client and the zone A 104a can be deployed within a common area (e.g., location A 102a) and/or coupled via a local area network. The new data portion to be stored to another zone, for example, zone B, which has been designated as the primary zone for storage of the new data portion. According to an embodiment, the new data portion is transferred to the primary zone through the zone A 104a. A replication component 204 can be utilized to determine whether zone A is a replication destination for the new data portion. If determined that another zone, for example, zone C (not shown), is the replication destination, a replication process is performed wherein zone A 104a, provides the new data portion to the primary zone, which can then send the new data portion to a replication destination zone (e.g., zone C). In this example, scenario, an acknowledgement message can be received from the primary zone on receiving the new data portion from zone A 104a.

Alternatively, the replication component 204 can determine that zone A is a replication destination (e.g., if there are only two zones, if the zone A is explicitly designated to store the replicated data, and/or the replication policy specifies "replicate to all zones", etc.). In this example scenario, a location determination component 206 can receive, from the primary zone, location information for the new data portion. For example, the location information can comprise a list of trios such as, but is not limited to, a chunk ID, an offset within chunk, and/or a segment size. Typically, each trio describes location of a certain segment of the new data portion. Zone A 104a can utilize the location information to store the new data portion to its chunks within memory 208. It is noted that the chunks are owned by the primary zone and oftentimes zone A 104a does not have information about one or more of the chunks. In this example case, zone A 104a can pre-create (e.g., by employing the replication component 204) such chunks to store the new data portion without a delay. After replication, there are two copies of the new data portion, the primary one at the primary zone and a backup copy at memory 208 within zone A 104a. Since replication is achieved without data replication from the primary zone to zone A 104a, inter-zone network traffic is reduced.

Figure 3:
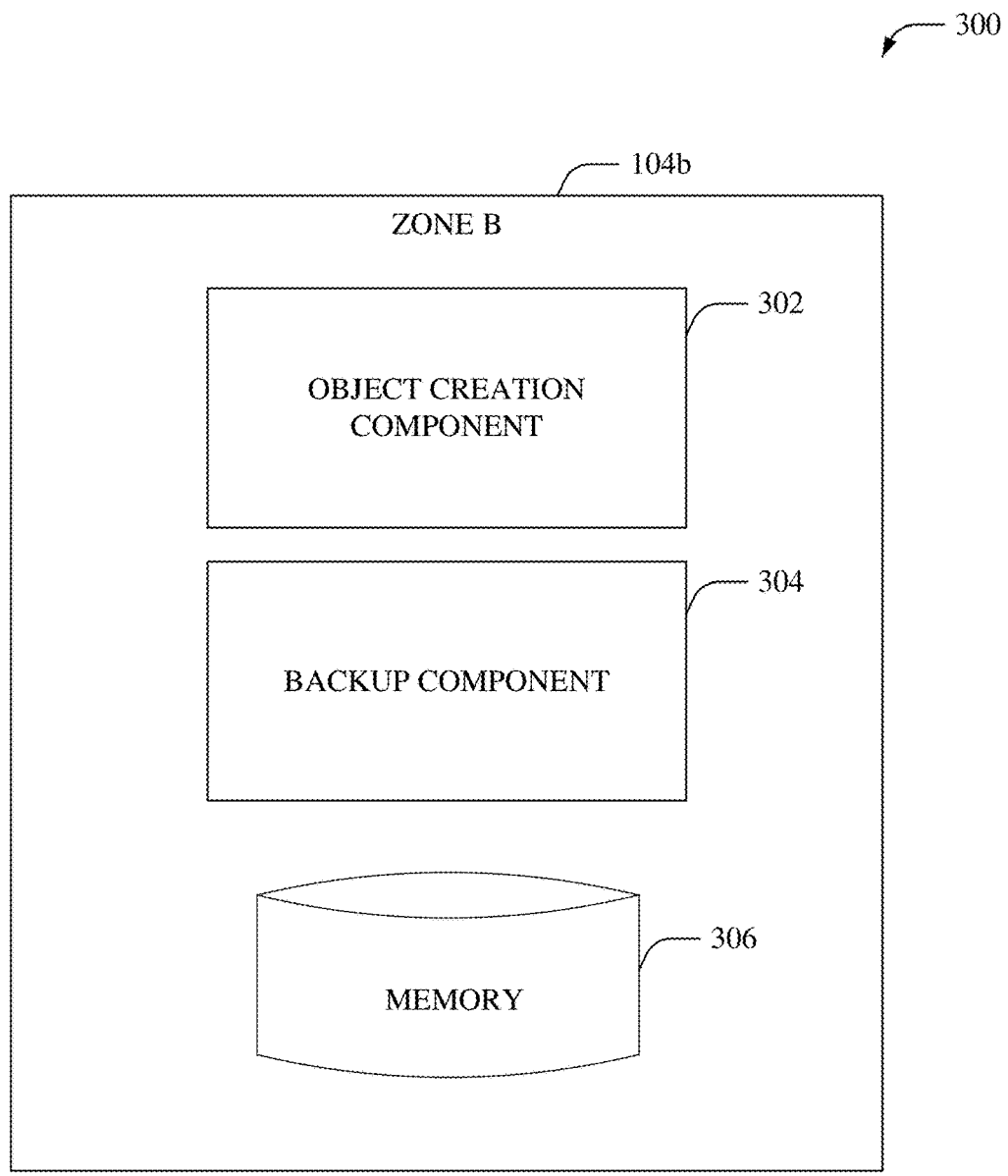
FIG. 3 illustrates an example system that transfers location information between zones of a distributed cloud storage system to facilitate reverse replication.

FIG. 3 illustrates an example system 300 that transfers location information between zones of a distributed cloud storage system to facilitate reverse replication, according to an aspect of the specification. As an example, system 300 can be implemented by one or more nodes within a replication source zone/primary zone (e.g., zone B 104b). According to an aspect, during reverse replication, a replication destination zone (e.g., zone A 104a) can send a new data portion to the replication source zone.

In an aspect, an object creation component 302 can receive a new data portion, for example, from a storage client locally coupled to another zone (e.g., zone A 104a). According to an embodiment, the new data portion is transferred to the object creation component 302 through the other zone (e.g., zone A 104a). In an aspect, the object creation component 302 can store the new data portion within one or more chunks stored in memory 306. A backup component 304 can be utilized for replicating the new data portion to one or more other zones. As an example, the backup component 304 can determine the replication destination zone. For example, if determined that the zone that sent the new data portion (e.g., zone A 104a) is the replication destination zone, the backup component 304 can provide location information for the new data portion to the zone. As an example, the location information can comprise a list of trios such as, but is not limited to, a chunk ID, an offset within chunk, and/or a segment size. Typically, each trio describes location of a certain segment of the new data portion. The replication destination zone can utilize the location information to store the new data portion to its chunks within its memory. According to an aspect, if determined that the zone that sent the new data portion (e.g., zone A 104a) is the replication destination zone, the backup component 304 can prohibit transmission of the new data portion back to the replication destination zone. It is noted that the chunks are owned by zone B 104b and oftentimes the replication destination zone does not have information about one or more of the chunks. In this example case, the replication destination zone can pre-create such chunks to store the new data portion without a delay.

In another example, if determined (e.g., by the backup component 304) that another zone (different from the zone that sent the new data portion) is the replication destination zone, the backup component 304 can provide the new portion of data and the location information to that zone for replication.

Figure 4:
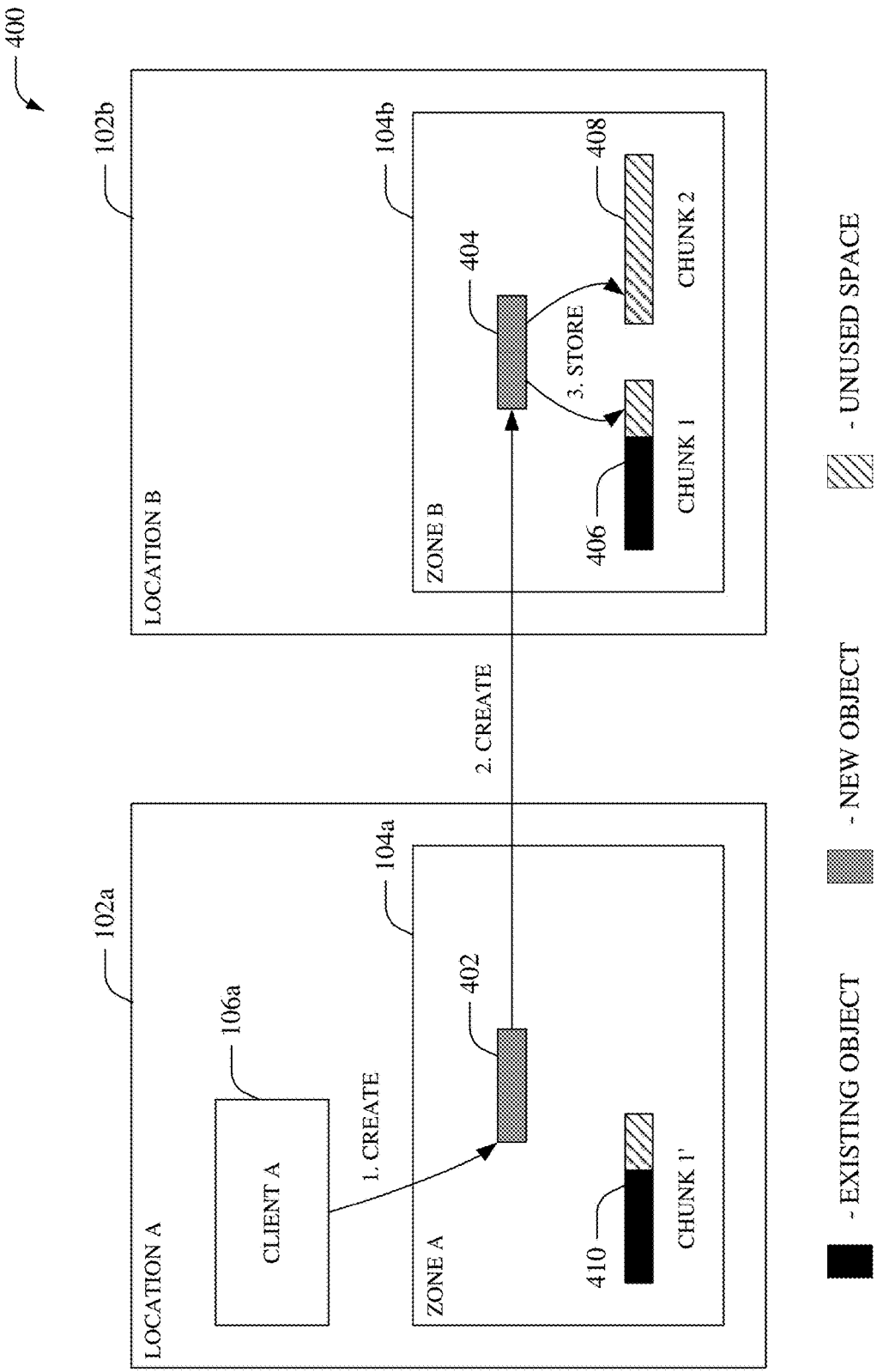
FIG. 4 illustrates an example system for delegation of object creation in accordance with an aspect of the specification.
Figure 5:
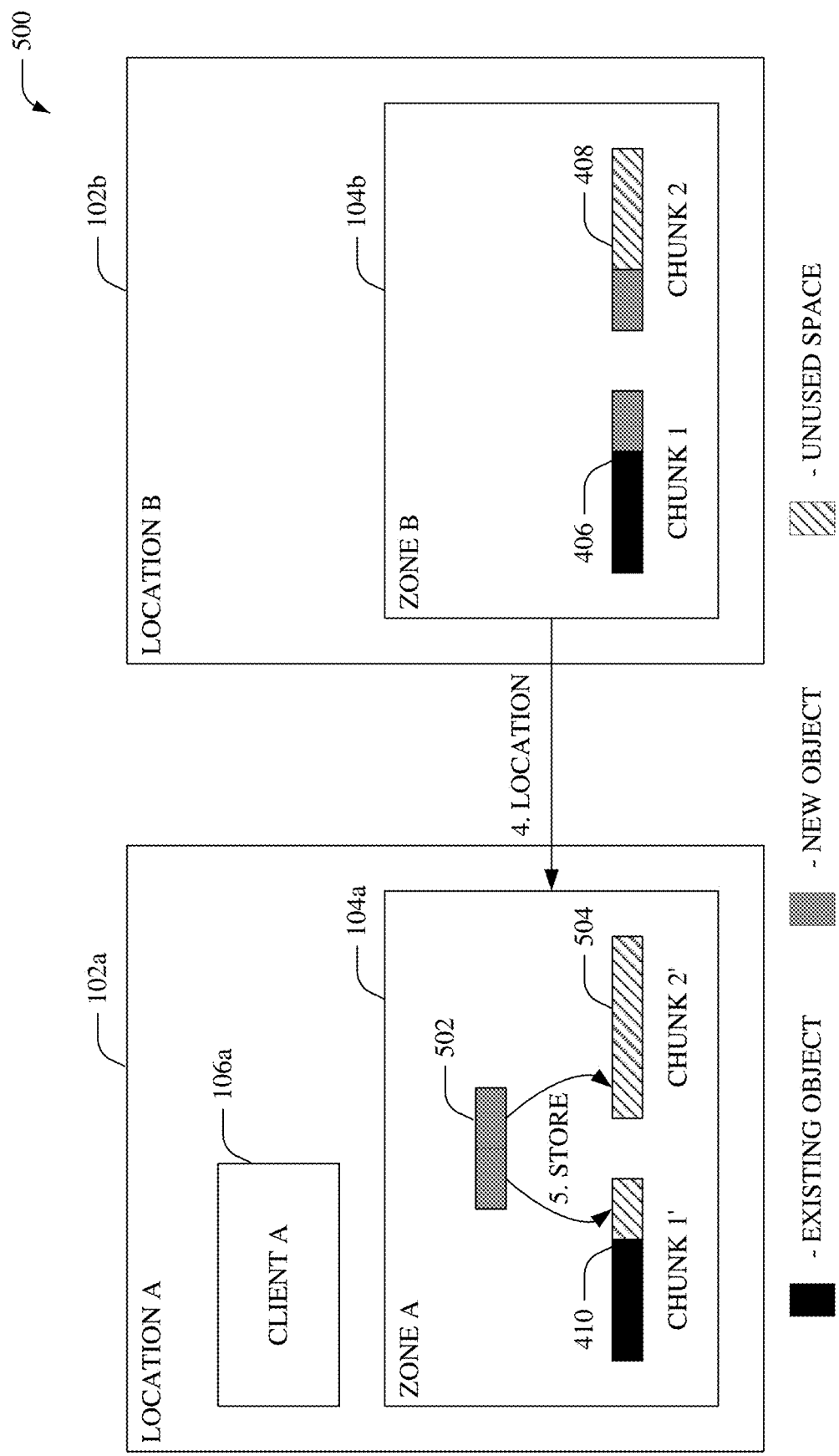
FIG. 5 illustrates an example system for storing a new object's backup copy without replication.
Figure 6:
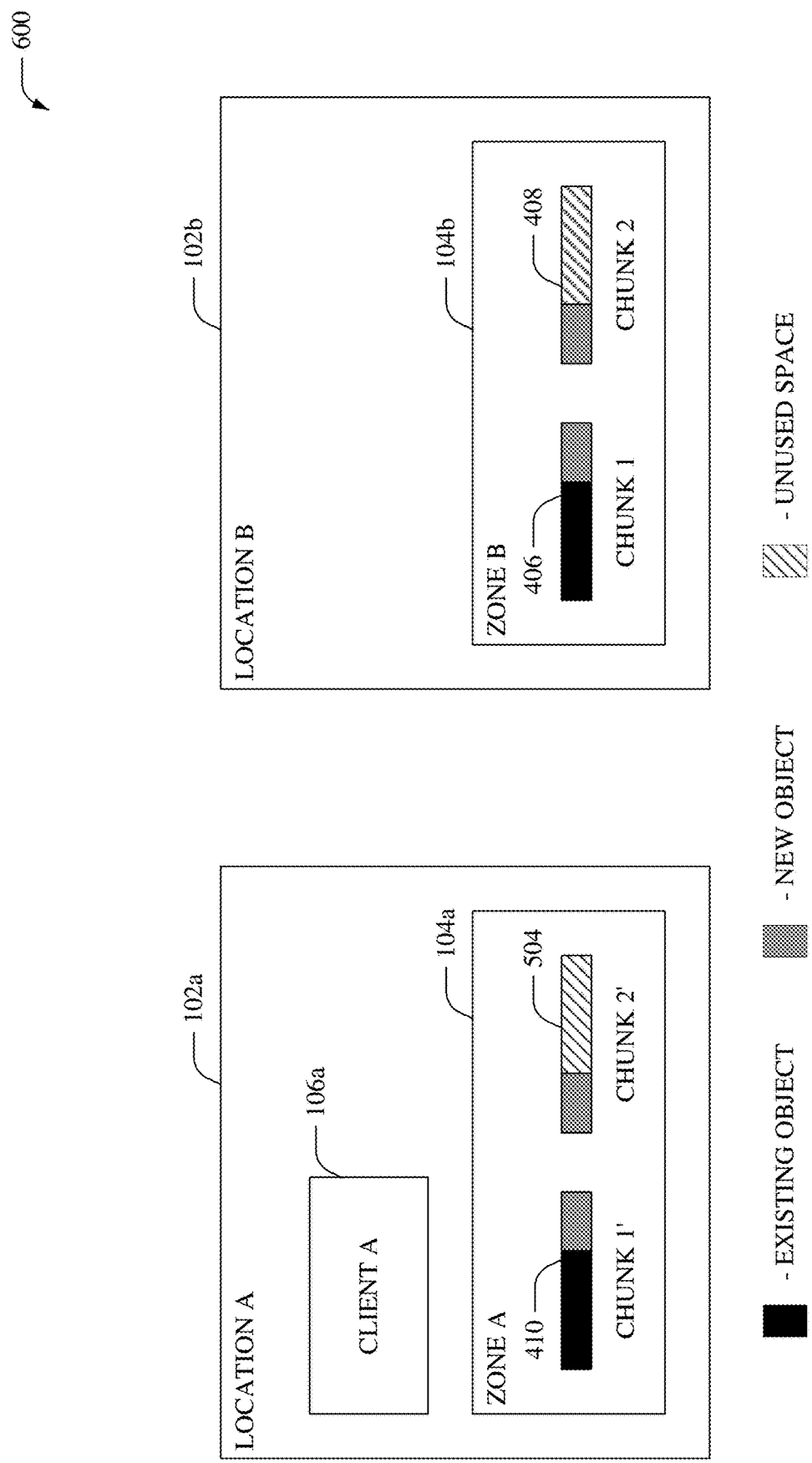
FIG. 6 illustrates an example system that depicts a final layout of zones comprising identical data sets that have been generated without replication.

Referring now to FIGS. 4-6, there illustrated are example systems 400-600 that provide an efficient implementation for reducing inter-zone traffic during data replication with an aspect of the specification. Systems 400-600 depict an example scenario wherein reverse replication is performed in a distributed storage system with a dual zone GEO setup. Although only two geographical locations (e.g., 102a and 102b) are depicted in the FIGS. 4-6, it is noted that the subject specification is not that limited and the GEO setup can comprise multiple zones at multiple locations.

FIG. 4 illustrates a system 400 for delegation of object creation. In one aspect, a new data object is created at location A 102a by client A 106a that is to be stored at location B 102b to zone B 104b. At 1, Client A 106a applies to its local zone, zone A 104a, and at 2, zone A 104a can delegate object creation to zone B 102b. As an example, the delegation can be performed if determined that the new data object has been created to update for an object, which has zone B 104b as its primary zone. In another example, the delegation can be performed based on defined policy data (e.g., if determined that zone A 104a has a greater load than zone B 104b, zone B 104b is a newly added zone, etc.). At 3, Zone B 104b can store the new data object to the end of an existing chunk 1 406 and to the beginning of newly created chunk 2 408.

FIG. 5 illustrates a system 500 for storing a new object's backup copy without replication. If determined that zone A 104a is the replication destination for zone B 104b, at 4, zone B 104b can transfer location information for the new object to zone A 104a. As an example, the location information can comprise a list of trios such as, but is not limited to, a chunk ID, an offset within chunk, and/or a segment size. Typically, each trio describes location of a certain segment of the new object 502. Typically, zone A 104a already has the backup copy of chunk 1 (chunk 1' 410) so at 5, it can store the first part of the new object 502 to the end of chunk 1' 410. Moreover, zone A104a can proactively create a backup copy for chunk 2 (chunk 2' 504) and store the second part of the new object 502 to the beginning of chunk 2'504.

FIG. 6 illustrates an example system 600 that depicts a final layout of zones comprising identical data sets that have been generated without replication. As an example, location B 102b can comprise a primary copy of the new data object and location A 102a can comprise the backup copy of the new object. It is noted that the new data itself has been transferred over the inter-zone network only once (e.g., at 2, from zone A 104a to zone B 104b). Accordingly, inter-zone network traffic doubling is avoided.

Figure 7:
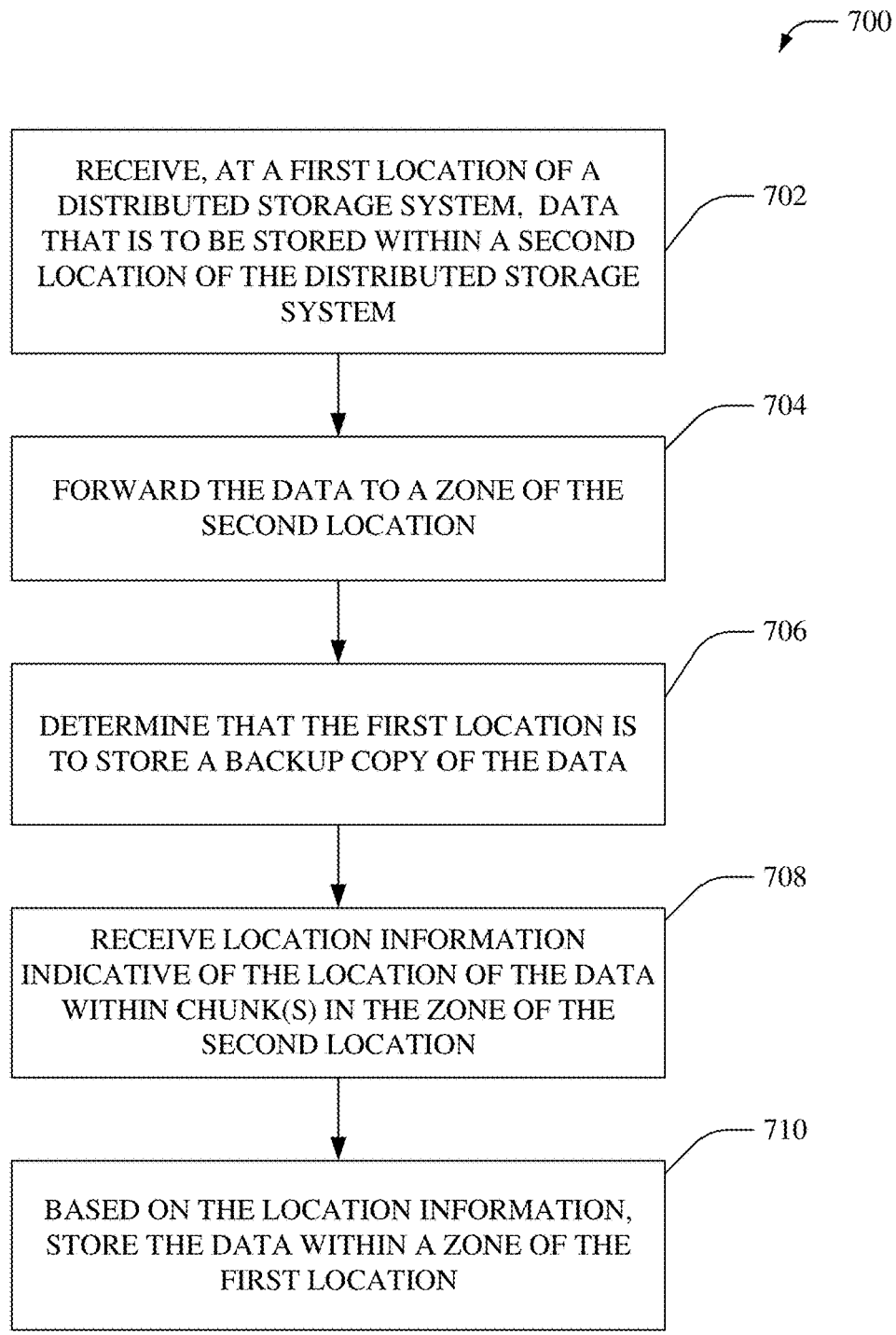
FIG. 7 illustrates an example method that facilitates reverse replication, according to an aspect of the subject disclosure.
Figure 8:
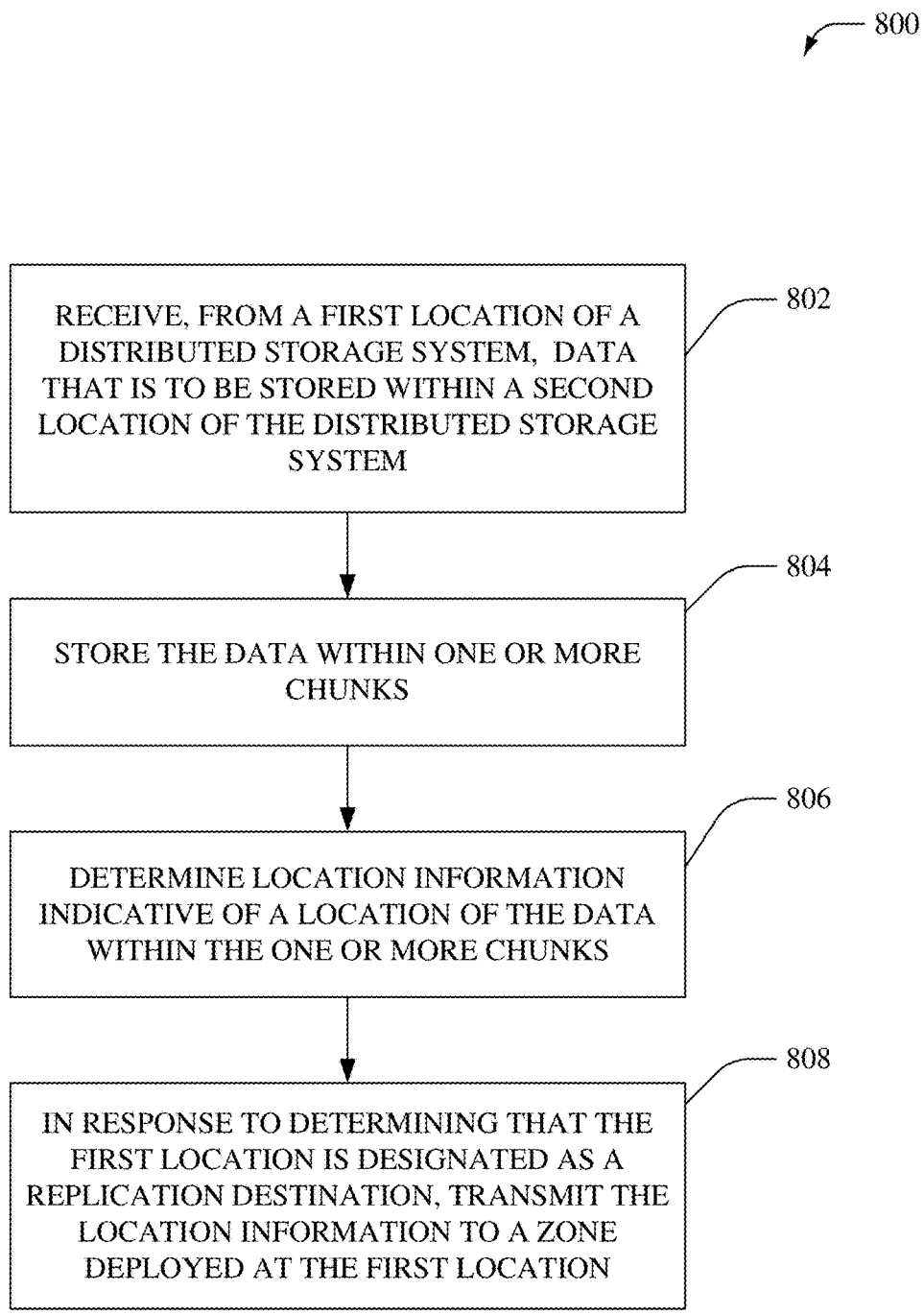
FIG. 8 illustrates an example method for reducing inter-zone network traffic in a distributed storage system.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, there illustrated is an example method 700 that facilitates reverse replication, according to an aspect of the subject disclosure. According to an aspect, method 700 can be implemented by one or more nodes of a distributed storage system. At 702, data that is to be stored within a second location of the distributed storage system is received at a first location of the distributed storage system. As an example, the data can be received from a storage client that is locally coupled to a zone deployed at the first location. It is determined that the data is to be stored at the second location, for example, if the second location has been designated at the primary storage location for the data, the data updates an object that is currently stored within the second location, a zone of the second location has a greater amount of resource availability and/or lower load as compared to a zone of the first location, etc.

At 704, the data can be forwarded to the second location. According to an embodiment, the data gets to the second location through a zone of the first location. At 706, it can be determined that the first location is designated as a replication destination for the data (e.g., designated to store a backup/secondary copy of the data). Accordingly, the zone of the first location can proactively retain the data for storage. Once the object is created and the data is stored within one or more chunks at the second location, at 708, location data indicative of the location of the data within the one or more chunks can be received. For example, the location information can comprise a list of trios such as, but is not limited to, a chunk ID, an offset within chunk, and/or a segment size. Typically, each trio describes location of a certain segment of the data. It is noted that the data is not re-transmitted from the second location to the first location. At 710, based on the location information, the data can be stored within a zone of the first location. After replication, there are two copies of the data, one at each of the locations.

FIG. 8 illustrates an example method 800 for reducing inter-zone network traffic in a distributed storage system, according to an aspect of the subject disclosure. According to an aspect, method 800 can be implemented by one or more nodes of the distributed storage system. At 802, data that is to be stored at a second location of the distributed storage system can be received from a first location of the distributed storage system. As an example, the data can be provided by a storage client that is locally coupled to a zone deployed at the first location. It is determined that the data is to be stored at the second location, for example, if the second location has been designated at the primary storage location, the data updates an object that is currently stored within the second location, a zone of the second location has a greater amount of resource availability and/or lower load as compared to a zone of the first location, etc.

At 804, the data can be stored within one or more chunks. As an example, one chunk can comprise segments of several different user objects. Each object segment can be described with location information comprising, but not limited to, chunk ID, segment offset, segment size, etc. At 806, the location information can be determined. Further, at 808, in response to determining that the first location is designated as a replication destination (e.g., a backup copy of the data is to be stored within a zone deployed at the first location), the location information can be transmitted to the zone deployed at the first location. The location information can be utilized to store the backup copy of the data. Since, the backup copy is stored without data replication from a replication source zone (e.g., zone deployed at the second location) to a replication destination zone (e.g., zone deployed at the first location), inter-zone network traffic is reduced.

Figure 9:
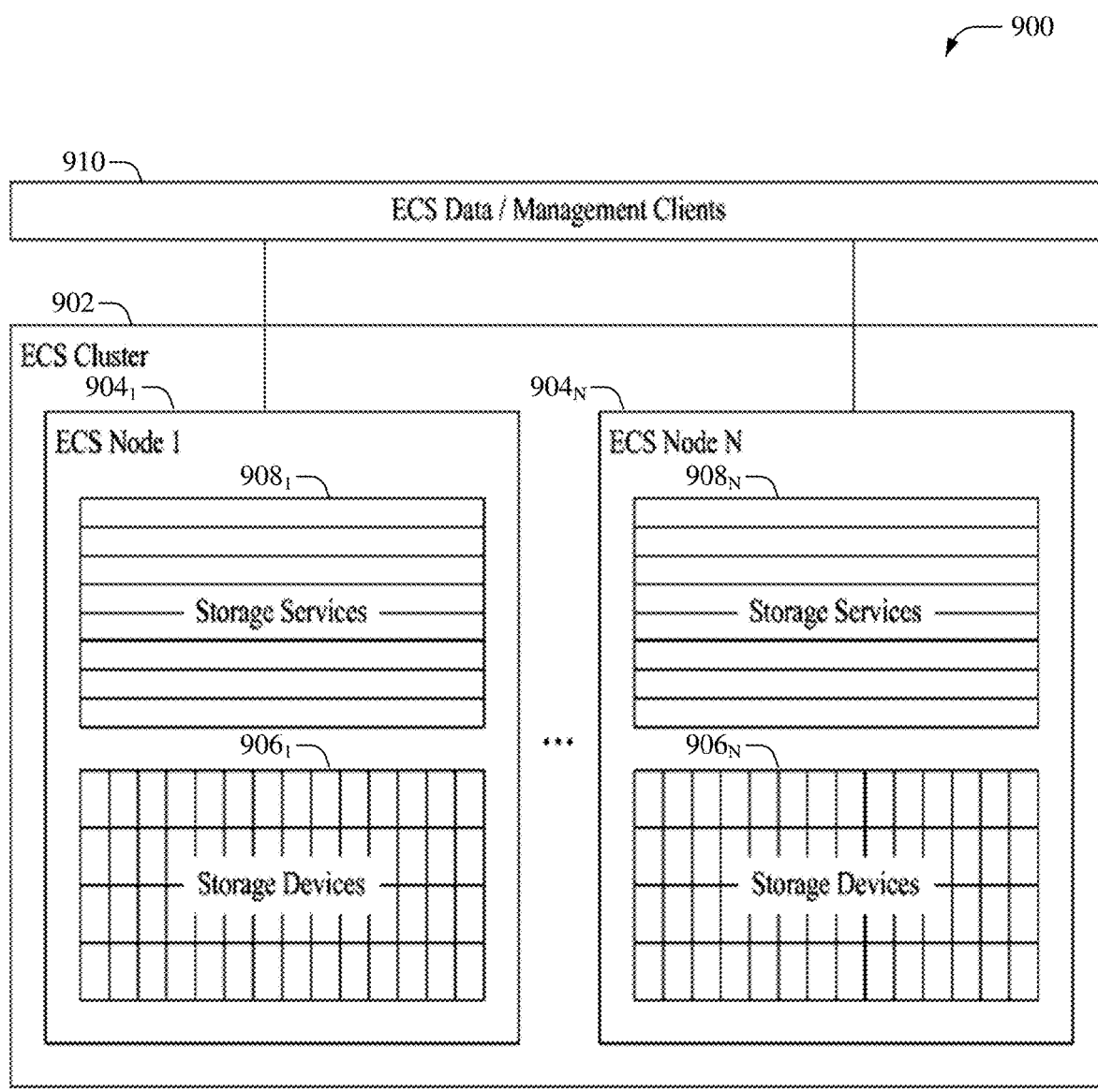
FIG. 9 illustrates high-level architecture of an Elastic Cloud Storage (ECS) cluster that employs reverse replication.

FIG. 9 illustrates an example high-level architecture 900 of an ECS cluster, according to an aspect of the subject disclosure. ECS can comprise a software-defined, cloud-scale, object storage platform that combines the cost advantages of commodity infrastructure with the reliability, availability and serviceability of traditional arrays. With ECS, an organization can deliver scalable and simple public cloud services with the reliability and control of a private-cloud infrastructure. ECS provides comprehensive protocol support for unstructured (object and/or file) workloads on a single, cloud-scale storage platform. In an aspect, one or more of the zones (e.g., zone A 104a, zone B 104b, etc.) described herein can comprise an ECS cluster 902 that can comprise multiple nodes $904_1$-$904_N$, wherein N is most any integer. The nodes $904_1$-$904_N$ can comprise storage devices (e.g. hard drives) 9061-906N and can run a set of services $908_1$-$908_N$. For example, single node that runs ECS version 3.0 can manage 20 independent services. Further, ECS data/management clients 910 can be coupled to the nodes $904_1$-$904_N$.

The ECS cluster 902 does not protect user data with traditional schemes like mirroring or parity protection. Instead, the ECS cluster 902 can utilize a k+m erasure coding protection scheme, wherein a data block is divided into k data fragments and m coding fragments are created (e.g., by encoding the k data fragments). Encoding can be performed in a manner such that the cluster 902 can tolerate the loss of any m fragments.

Figure 10:
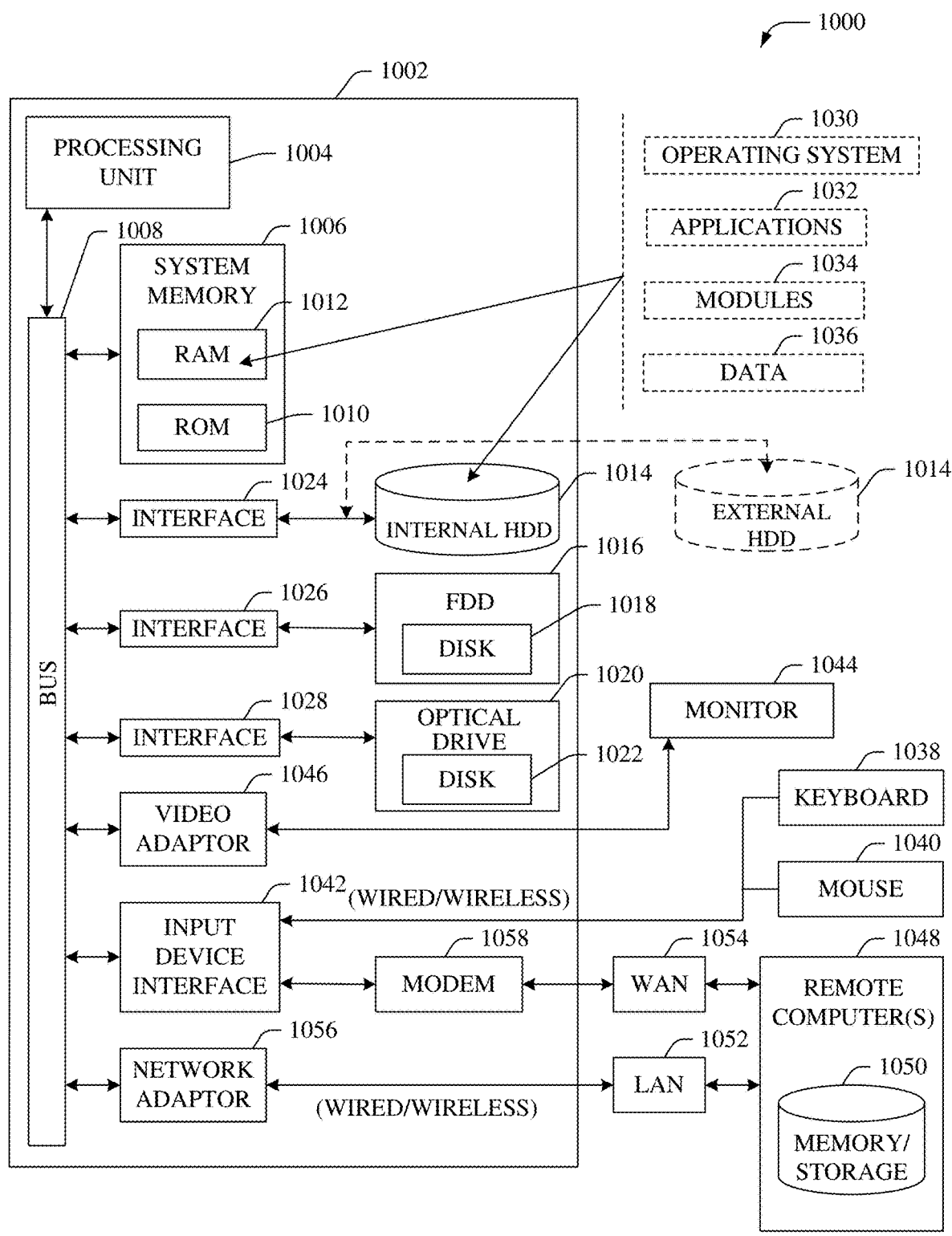
FIG. 10 illustrates a block diagram of an example computer operable to execute the disclosed storage system architecture.

Referring now to FIG. 10, there is illustrated a block diagram of a computer 1002 operable to execute the disclosed storage architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), driver(s), module(s), agent(s), engine(s), and/or device(s) disclosed herein with respect to systems 100-600 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at a 54 Mbps (802.11a) data rate, and/or a 2.4 GHz radio band at a 11 Mbps (802.11b), a 54 Mbps (802.11g) data rate, or up to a 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        in response to determining that data is to be stored within a first zone of a storage device of a distributed storage system, facilitating a transmission of the data from a second zone of another storage device of the distributed storage system to the first zone, wherein the first zone is deployed within a first geographical area and the second zone is deployed within a second geographical area;
        receiving, from the first zone, location information that represents a location of the data within one or more chunks of disk space within the first zone; and
        based on the location information, storing a backup copy of the data within the second zone.

2. The system of claim 1, wherein the operations further comprise:
    receiving the data from a storage client device that is locally coupled to the second zone.

3. The system of claim 1, wherein the determining comprises determining that the data is to be stored within the first zone based on verifying that the data is utilized to update an object stored within the first zone.

4. The system of claim 1, wherein the determining comprises determining that the data is to be stored within the first zone based on policy data indicative of a policy associated with data replication.

5. The system of claim 1, wherein the determining comprises determining that the data is to be stored within the first zone based on load data associated with at least one of a first load of the first zone or a second load of the second zone.

6. The system of claim 1, wherein the location information comprises identifier data indicative of an identifier of a chunk of the one or more chunks.

7. The system of claim 1, wherein the location information comprises offset data indicative of an offset within a chunk of the one or more chunks.

8. The system of claim 1, wherein the location information comprises size data indicative of a size of a segment of the data stored within a chunk of the one or more chunks.

9. The system of claim 1, wherein the receiving the location information comprises receiving the location information in response to a verification that the second zone is designated to store the backup copy.

10. The system of claim 1, wherein the distributed storage system comprises an object storage system.

11. A method, comprising:
    in response to determining that data is to be stored within a first zone of a storage device of a distributed storage system, directing, by a system comprising a processor, the data from a second zone of another storage device of the distributed storage system to the first zone, wherein the first zone is deployed within a first geographical area and the second zone is deployed within a second geographical area;
    subsequent to the data being stored within one or more chunks of storage space within the first zone, receiving, from the first zone, location information that represents a location of the data within the one or more chunks; and
    based on the location information, storing a backup copy of the data within the second zone.

12. The method of claim 11, further comprising:
    receiving the data from a storage client located within the second geographical area.

13. The method of claim 11, wherein the receiving the location information comprises receiving identifier data indicative of an identifier of a chunk of the one or more chunks.

14. The method of claim 11, wherein the receiving the location information comprises receiving offset data indicative of an offset within a chunk of the one or more chunks.

15. The method of claim 11, wherein the receiving the location information comprises receiving size data indicative of a size of a segment of the data stored within a chunk of the one or more chunks.

16. The method of claim 11, wherein the receiving the location information comprises receiving the location information in response to verifying that the second zone is designated as a replication destination zone that is to be employed to store the backup copy.

17. A non-transitory computer-readable storage medium comprising instructions that, in response to execution, cause a system comprising a processor to perform operations, comprising:
    in response to determining that data is to be stored within a first zone of a storage device of a distributed storage system, receiving the data from a second zone of another storage device of the distributed storage system, wherein the first zone is deployed within a first geographical area and the second zone is deployed within a second geographical area;
    storing the data within at least one chunk of storage space within the first zone; and
    in response to determining that the second zone is designated as a replication destination zone that is employable to store a backup copy of the data, directing, to the second zone, location information that represents a location of the data within the at least one chunk.

18. The non-transitory computer-readable storage medium of claim 17, wherein the operations further comprise:
    in response to the determining, prohibiting a transmission of the data from the first zone to the second zone.

19. The non-transitory computer-readable storage medium of claim 17, wherein the operations further comprise:
    in response to determining that a third zone of the distributed storage system has been designated as the replication destination zone, facilitating a transmission of the data from the first zone to the third zone.

20. The non-transitory computer-readable storage medium of claim 17, wherein the distributed storage system comprises an object storage system.

\* \* \* \* \*